(12) United States Patent
Lochner et al.

(10) Patent No.: US 11,396,142 B2
(45) Date of Patent: Jul. 26, 2022

(54) DISPOSABLE MOLD CORE, METHOD FOR PRODUCING A COMPONENT, AND THE COMPONENT ITSELF

(71) Applicant: KTM-TECHNOLOGIES GMBH, Salzburg/Anif (AT)

(72) Inventors: Hans Lochner, Ramsau (DE); Peter Martin, Saaldorf-Surheim (DE)

(73) Assignee: KTM Technologies GmbH, Salzburg/Anif (AT)

( * ) Notice: Subject to any disclaimer, the term of this patent is extended or adjusted under 35 U.S.C. 154(b) by 421 days.

(21) Appl. No.: 16/468,895

(22) PCT Filed: Dec. 6, 2017

(86) PCT No.: PCT/EP2017/081720
§ 371 (c)(1),
(2) Date: Aug. 15, 2019

(87) PCT Pub. No.: WO2018/108674
PCT Pub. Date: Jun. 21, 2018

(65) Prior Publication Data
US 2021/0323245 A1 Oct. 21, 2021

(30) Foreign Application Priority Data
Dec. 12, 2016 (DE) ..................... 10 2016 124 061.3

(51) Int. Cl.
*B29C 70/34* (2006.01)
*B29C 33/52* (2006.01)
*B29C 33/54* (2006.01)
*B29C 70/54* (2006.01)
*B33Y 80/00* (2015.01)

(52) U.S. Cl.
CPC .............. *B29C 70/34* (2013.01); *B29C 33/52* (2013.01); *B29C 33/54* (2013.01); *B29C 70/54* (2013.01); *B33Y 80/00* (2014.12)

(58) Field of Classification Search
None
See application file for complete search history.

(56) References Cited

U.S. PATENT DOCUMENTS 4,248,817 A   2/1981   Frank
5,132,069 A   7/1992   Newton
(Continued)

FOREIGN PATENT DOCUMENTS

CN   102101361   6/2011
CN   104742383   7/2015
(Continued)

OTHER PUBLICATIONS

Chinese Examination Report for Application No. 201780076004.X, dated Dec. 17, 2020 with English Translation.
(Continued)

*Primary Examiner* — Jacob T Minskey
*Assistant Examiner* — Adrien J Bernard
(74) *Attorney, Agent, or Firm* — JK Intellectual Property Law, PA (57) ABSTRACT

A disposable mold core for producing a fiber-reinforced component includes a support core having a granulate and a binder. The support core has a hard shell formed of the binder and the granulate, and an inner core which is binder-free and formed of the granulate. A related method of producing a fiber-reinforced component is disclosed.

23 Claims, 7 Drawing Sheets

(56) References Cited

U.S. PATENT DOCUMENTS

| | | |
|---|---|---|
| 5,204,055 A | 4/1993 | Sachs |
| 5,784,926 A | 7/1998 | Maass |
| 6,264,868 B1 | 7/2001 | Marchant |
| 8,734,704 B2 | 5/2014 | Kunze |
| 2003/0144062 A1 | 7/2003 | Holemans et al. |
| 2008/0145592 A1 | 6/2008 | Johnson |
| 2011/0168324 A1 | 7/2011 | Ender |
| 2012/0090770 A1 | 4/2012 | Cavaliere et al. |
| 2014/0326738 A1 | 11/2014 | Knoop |
| 2015/0320956 A1 | 11/2015 | Dunne |
| 2017/0008221 A1 | 1/2017 | Huber et al. |
| 2019/0061287 A1 | 2/2019 | Amon et al. |

FOREIGN PATENT DOCUMENTS

| | | |
|---|---|---|
| DE | 699 06 095 T2 | 11/1940 |
| DE | 10 2004 009 744 A1 | 9/2005 |
| DE | 10 2005 008 884 A1 | 8/2006 |
| DE | 10 2007 026 453 A1 | 12/2008 |
| DE | 10 2013 106 876 A1 | 1/2015 |
| DE | 102013106876 A1 | 1/2015 |
| DE | 10 2013 019 470 A1 | 5/2015 |
| DE | 10 2014 019 470 A1 | 5/2015 |
| DE | 10 2013 226 017 A1 | 6/2015 |
| DE | 10 2014 207 860 A1 | 10/2015 |
| DE | 10 2014 118577 A1 | 6/2016 |
| DE | 10 2015 209 918 A1 | 12/2016 |
| DE | 10 2015 209762 A1 | 12/2016 |
| EP | 2 145 751 A1 | 1/2010 |
| EP | 2 335 899 A1 | 6/2011 |
| GB | 2146572 A | 4/1985 |
| JP | S50-145474 A | 11/1975 |
| JP | S52-107069 | 9/1977 |
| JP | S6131218 A | 2/1986 |
| JP | H03 270912 A | 12/1991 |
| JP | H04294132 A | 10/1992 |
| JP | H09174569 A | 7/1997 |
| JP | H11-77701 A | 3/1999 |
| JP | 2002-001788 A | 1/2002 |
| JP | 2004-249654 A | 9/2004 |
| WO | 2013/0126981 A1 | 9/2013 |

OTHER PUBLICATIONS

International Search Report for Application No. PCT/EP2017/081720, dated Jun. 6, 2018.
German Office Action dated Jul. 24, 2017.
International Preliminary Report on Patentability, for International Application No. PCT/EP2017/081720, dated Jun. 18, 2019 with English Translation.
German Search Report for German Application No. DE10 2016 103 979.9, dated Oct. 25, 2016.
English Translation of International Search Report for PCT/EP2017/054740, dated Sep. 4, 2018.
Japanese Office Action dated Jun. 8, 2021, with English Translation.
Japanese Office Action for Application No. 2018-565460, dated Feb. 9, 2021, with English Translation.

DISPOSABLE MOLD CORE, METHOD FOR PRODUCING A COMPONENT, AND THE COMPONENT ITSELF

CROSS-REFERENCE TO RELATED APPLICATIONS

This application is a national stage of International Application No. PCT/EP2017/081720, filed Dec. 6, 2017, and claims benefit to German Application No. 10 2016 124 061.3, filed Dec. 12, 2016, both of which are incorporated by reference herein.

TECHNICAL FIELD

The present disclosure relates to a disposable mold core for producing a fiber-reinforced component having a hard supporting core manufactured from granulate, in particular from a mineral base material, glass, ceramic, and/or sand, and a binder. The disclosure also relates to a method for producing a fiber-reinforced component in which reinforcement fibers, in particular as woven fabric, non-crimp fabric and/or braided fabric, are placed on a disposable mold core together with a matrix, and the matrix is hardened in a molding tool by increasing the temperature and/or pressure. Furthermore, the disclosure includes a fiber-reinforced component, especially an undercut and/or hollow component, with a base body developed at least partially from reinforced fibers that form a woven fabric, non-crimp fabric and/or braided fabric, and a hardened matrix. Additionally, the disclosure includes a disposable mold core for producing a fiber-reinforced component with at least two segments that can be rinsed off it with a solvent after the component has been produced. Moreover, the disclosure includes a manufacturing process for a disposable mold core to produce a fiber-reinforced component in which at least two segments are developed and the mold core consists of these two segments.

BACKGROUND

Mold cores that can be rinsed off for the production fiber-reinforced components are known from the general state of the art. The disadvantage with such mold cores is that the manufacturing of the mold core and of the component itself is very expensive.

SUMMARY

Therefore, the task of the present disclosure is to create a disposable mold core that can be economically produced either itself or the component produced with it.

The task is solved by disposable mold cores used to produce components, its manufacturing processes and a component according to the characteristics of the independent claims.

A disposable mold core to produce a fiber-reinforced component with a hard support core produced from a granulate and a binder is suggested. The granulate can be a mineral base material, glass, ceramic and/or sand. The component can also be a structural hollow component, for example.

According to the disclosure, the support core has a hard shell made from the binder and granulate. The hard shell provides stability to the mold core, so that reinforcement fibers can be placed on the shell to produce the component.

In addition, the support core has a binder-free inner core formed by granulate. Compared to the shell, it can be detached quicker and/or easier after the fiber-reinforced component is manufactured, compared to the shell. For example, the core can be shaken out of the shell. Thus, the granulate is preferably free-flowing. As a result of that, the granulate can be easily removed from the component, thereby lowering manufacturing costs. If the high pressure makes the granulate stick together, it must first be loosened, which can be done with a liquid and/or mechanically.

In an advantageous further development of the disclosure, the granulate of the inner core is loose. Additionally or alternatively, the granulate of the inner core can also be compressed and/or sticking together. As a result of that, the individual granulate grains lie tightly close together and the granulate can therefore absorb pressure forces in the interior of the core, which occur for example when the reinforcement fibers are placed on the mold core with the matrix or when the component is being produced. This prevents a deformation of the mold core, so that the component is also produced without deformations.

It is likewise advantageous if the support core is produced in a rapid prototyping process in which the support core can be printed, for example. In this case, the rapid prototyping process is an economical and fast method to produce the support core.

It is also advantageous if the binder concentration decreases from an outer surface of the support core towards its interior. Here, the concentration can also decrease towards the middle of the cross section. In addition, the concentration can decrease linearly, parabolically and/or exponentially. For example, the concentration can decrease here from 100% on the outer surface all the way down to 0% in the interior.

It is furthermore advantageous if the shell is less than 5 mm thick. However, the shell can also be less than 2 mm thick and therefore, the shell becomes stable on the one hand and a lot of granulate without binder is in the core, on the other hand, so an especially large quantity of granulate can be shaken out after the component is produced.

Here, it is also advantageous if the shell has a thickness of 3% to 10% of the respective diameter on the corresponding place of the mold core. This makes it possible to save binder to lower costs while maintaining the stability of the mold core.

It is also advantageous if the shell has a separating layer that seals off the support core towards the exterior. Here, the separating layer can be elastic and additionally or alternatively be developed using a silicone and/or plastic layer. This can prevent the matrix from diffusing into it while the component is being produced. During the manufacturing of the component, the matrix is placed on the mold core together with the reinforcement fibers, wherein the matrix is combined with the reinforcement fibers under higher pressure and/or temperature to bind to the component. The separating layer prevents the matrix to diffuse into the mold core, at least partially. The diffusing into it is detrimental because otherwise the matrix will combine with the granulate and the latter can only be removed from the component with difficulty.

It is furthermore advantageous if the binder can be dissolved with a solvent, so that it can be rinsed off after the fiber-reinforced component has been produced. Additionally or alternately, the separating layer can also be soluble. The solvent can be an acid, a base, water and/or an alcohol, for example. As a result of that, the binder and/or the separating layer can be easily rinsed off from the component.

It is furthermore advantageous if the shell has at least one opening area in which the shell can be split open to form an opening. The shell can also have the opening from the outset. After manufacturing of the fiber-reinforced component, the loose core can trickle out through the opening. Here, the opening can be arranged on a front side of the mold core, for example. The opening allows the granulate and/or the shell to be very easily removed or rinsed off.

Moreover, a process for producing a fiber-reinforced component is suggested in which reinforcement fibers are arranged together with a matrix around a disposable mold core in order to develop a fiber-reinforced component. The reinforcement fibers can include a woven fabric, non-crimp fabric and/or braided fabric. The matrix is then hardened in a molding tool by increasing the temperature and/or pressure.

According to the disclosure, after the matrix has been hardened and while the mold core is still inside the component, at least one reinforcement element is pressed onto an external surface of the component under pressure. Only afterwards is the disposable mold core at least partially removed from the component. If the mold core is still in the component, it contributes to its stability, so that the reinforcement element can be pressed onto the component without deforming it.

Additionally or alternatively, a mold core according to one or several of the characteristics described above and/or below is used, wherein the above-mentioned characteristics can be present individually or in any combination. The mold core also includes a hard shell and a binder-free and/or loose core. After the fiber-reinforced component is produced, the core is removed from the shell, especially rinsed off and/or shaken out. Since the core has been developed loose and/or without binder, it can be easily removed from the component. If owing to the high pressure, the granulate sticks together, it must be loosened first with a liquid and/or mechanically, for example.

In an advantageous further development of the disclosure, the shell—particularly after the core is removed—is rinsed off with a solvent. After the core has been shaken out, only the shell remains arranged in the component, which now creates a large attack surface for the solvent, allowing it to dissolve the shell especially quickly. Thus, a simple shaking out of the dissolved shell can likewise remove it from the component. Alternately, the shell can also remain in the component, however.

It is also advantageous if the reinforcement element is arranged around the disposable mold core together with the reinforcement fibers and the matrix. In this case, the matrix can still be unhardened. Additionally or alternatively, the reinforcement element can include an unhardened molding material, such as a C-SMC (C-sheet molding compound). Only in a subsequent step can the matrix be hardened together with the reinforcement element or molding material. As a result of this, the reinforcement element can be firmly joined to the matrix during hardening and thus to the reinforcement fibers. Because of this, the reinforcement element and the matrix with the reinforcement fibers are stably, especially firmly, joined.

It is likewise advantageous if the reinforcement element is pressed onto the hardened matrix. In this process, the matrix can also be fully hardened. As a result of this, the component already has a certain stability so that the reinforcement element can be pressed onto the component without damage. The reinforcement element can be molding material such as a C-SMC (C-sheet molding compound).

A fiber-reinforced component having a main body made at least partially of reinforcement fibers and a hardened matrix is furthermore suggested. The component can be, for example, an undercut and/or a hollow component. Here, the reinforcement fibers can form a woven fabric, non-crimp fabric and/or braided fabric.

According to the disclosure, the component is manufactured according to one or several process characteristics described above and/or below. Furthermore, the main body has on its external surface at least one reinforcement firmly joined to it. The reinforcement element serves to increase the stability or stiffness of the component.

Additionally or alternatively, the component is developed as hybrid component, wherein a part of the main body is made from a molding material that includes a hardened matrix with loose reinforcement fibers. Additionally or alternatively, the reinforcement element can also be made from the molding material. Here, the molding material can be easily pressed onto the component. In addition, the component can be easily manufactured, at least partially, from the molding material.

In an advantageous further development, the reinforcement element includes strengthening ribs and/or a reinforcement structure. The strengthening ribs can be easily and economically manufactured. The reinforcement structure makes the component very stable.

Additionally or alternatively, it is advantageous if the reinforcement element is executed from a fiber composite and/or metal. In this case, the fiber composite includes a reinforcement fiber and a matrix. For example, the fiber composite can be made from the same reinforcement fiber/matrix mixture as the component. Thus, the fiber composite has essentially the same properties of the component, like the same temperature expansion. As a result of that, tensions occurring between the component and the reinforcement element due to a different temperature expansion, for example, are lowered. The fiber composite can also include a C-SMC (C-sheet molding compound) and form the molding material. In this case, the molding material can be placed particularly easily on the external surface and is economical.

It is additionally advantageous if a firm bond is developed between the matrix and the reinforcement element. Here, the reinforcement element can include a molding material, especially made of C-SMC. The firm bond considerably enhances the strength between the component and the reinforcement element.

It is furthermore advantageous if at least one fastening element like a threaded insert, sleeve, hook and/or a bore is arranged in and/or on the reinforcement element. This allows the fastening element to be arranged on the component with the reinforcement element and dispenses with the need to rework the component to arrange the fastening element on it.

A disposable mold core to produce a fiber-reinforced component with at least two segments is being suggested. After the component is produced, the at least two segments can be rinsed off it with a solvent and the mold core is removed from the component to reduce its weight. Moreover, the mold core can have one or several of the characteristics described above and/or below.

According to the disclosure, the disposable mold core includes at least one elastic and/or flexible compensatory element arranged between the two segments. The compensatory element connects both segments in such a relatively movable way to one another that a translational and/or rotational misalignment between the two segments can be compensated. The compensatory element makes it possible to compensate for measurement inaccuracies of the mold core or segments that can lead to the translational and/or rotational misalignment. If, for example, the rotational misalignment occurs between the two segments, they can be twisted against one another by means of the elastic and/or flexible compensatory element, thereby compensating for this rotational misalignment. Here, the compensatory element is stretched and/or compressed in areas, thus furthermore connecting the two segments. On the other hand, if the translational misalignment occurs, which is the case for example when the segments are too widely separated from one another, the compensatory element can be compressed to reduce the distance accordingly, which keeps the segments joined.

In an advantageous further development of the disclosure, the compensatory element is joined to the segment in a firm and/or interlocking way in one of its connecting areas. The firm bond can be easily created and is especially secure. Here, the connecting area can be arranged on the front side of the corresponding segment.

It is likewise advantageous if the two segments corresponding to one another firmly engage with their connecting areas. For example, they can engage in such a way that they form an articulated joint between them. The articulated joint can also be executed as a hinge and/or ball joint. For example, a rotational misalignment can be compensated especially easily with the ball joint because it allows a rotation by three rotational axes oriented orthogonally to each other (in a Cartesian coordinate system, they can be the x-, y-, and z-axis) to compensate for the rotational misalignment. In addition, the ball joint can have a ball socket on one segment and a respective spherical head on the corresponding segment, wherein the spherical head is pivot mounted in the ball socket.

It is also advantageous if the compensatory element is made of an elastomer, an unhardened thermoplastic, an unhardened thermoset and/or an adhesive that is still elastic and/or flexible in a solidified state. The thermoplastics can be polyvinyl alcohols, for example. Here, an elastomer has the elastic and/or flexible properties.

The unhardened thermoplastics and/or unhardened thermosets can be used, for example, to fix the two segments in place. To achieve this, the thermoplastics and/or thermosets are not fully hardened yet while the two segments are being assembled so that they can be easily arranged between the segments.

In order to join the two segments, the thermoplastics are for example heated first, arranged between the segments and then cooled off once again. The thermoplastics can be heated to become fluid again after the component is produced, for example, so they can be rinsed off the component. The thermoplastics can be polyvinyl alcohols, for example.

The thermosets can likewise be heated first, arranged between the segments and then cooled off once again. Thermosets are here more heat-resistant than the thermoplastics and/or elastomers, for example.

Additionally or alternately, the compensatory element can also be made from an adhesive that is still elastic and/or flexible in a solidified state. In this case, the adhesive can be liquid to viscous, for example, so it can be easily arranged between the segments. After some time, the adhesive then solidifies by itself without needing additional treatment, thereby simplifying the manufacturing of the mold core.

In this process, mixtures between elastomer, thermoplastic, thermoset and/or adhesive can also be used as compensatory element.

It is likewise advantageous if the compensatory element includes an expansion material that expands when the temperature is increased, so that the two contiguous segments can be pressed apart during the manufacturing of the component. As a result of this, the segments can be pressed against an inner side of a molding tool while the component is being produced. This allows the component to have a more accurate shape and reduces, for example, the play of the mold core in the molding tool.

It is advantageous here for the expansion material to be made of wax, silicon, plastic, fat and/or a low-melting alloy. For example, a wax, silicon and/or fat can be easily rinsed off the fiber-reinforced component.

It is furthermore advantageous if the segments are executed as one single piece, are separated from one another and/or are in a row in longitudinal direction of the mold core. The one-piece execution of the segments allows them to be manufactured very easily and quickly. Owing to their separation, the segments cannot interlock. If the segments are longitudinally aligned in rows next to one another, the mutually connecting areas of the segments are kept as small as possible, thus economizing on compensatory elements.

It is also advantageous if the segments are made from one granulate that includes a granulate and/or binder. The segments can be made, for example, from a porous granulate and/or with one having spaces, thereby economizing on segment weight. In addition, the granulates can be made from a mineral base material, glass, ceramic and/or sand, all of them easily processed.

It is furthermore advantageous if the binder of the segments and/or at least partially the compensatory element, especially the expansion material, can be dissolved with a solvent so that the mold core can be rinsed off the component after it has been produced. The solvent can be, for example, an acid, a base, water and/or an alcohol. The binder, the compensatory element and/or the expansion material can therefore be rinsed off the component with a solvent as part of an easy work step.

It is likewise advantageous if the mold core has rinse-off hollow space extending, at least partially, through the segments and/or the compensatory element by means of which the mold core release can be accelerated. The solvent can be introduced purposefully in the rinse-off hollow space to dissolve the segments on all sides and/or the compensatory element, as a result of which the mold core is rinsed off faster.

A manufacturing process for a disposable mold core to produce a fiber-reinforced component is also suggested. Here, the mold core can be executed according to at least one of the characteristics described above and/or below. At least two segments are developed in the manufacturing process. The mold core will then be assembled from these two segments.

According to the disclosure, the segments are aligned with respect to one another and subsequently firmly joined to each other in a relatively movable way with at least one elastic and/or flexible compensatory element. As a result of this, a translational and/or rotational misalignment between the two segments can be compensated. A measurement inaccuracy or manufacturing tolerance of the mold core or segments can lead to a translational and/or rotational misalignment, which leads to a defective component. For example, the translational misalignment can develop when the segments are too closely separated from one another. The component produced with such a mold core would have dimensions that are too small. By means of the elastic and/or flexible compensatory element, the two segments can be aligned and joined in such a way that this translational misalignment is compensated. To do this, the compensatory element can also be stretched and/or compressed in order to compensate for the translational and/or rotational misalignment, while still connecting the segments.

In an advantageous further development of the manufacturing process, the mold core is produced as one single piece and then split into the segments. This allows one, for example, to first check whether and how the translational and/or rotational misalignment of the mold core has been developed. Afterwards, the mold core can be split into advantageous segments, so that as few segments as possible result from compensating for the manufacturing tolerance. Alternately, the segments of the mold core can be produced separately from one another. Contrary to a larger mold core, smaller segments can be manufactured with greater accuracy, thereby reducing measurement inaccuracy is reduced beforehand.

The mold core or the segments can be manufactured by means of a core-shooting and/or rapid prototyping process, for example.

It is furthermore advantageous if a compensatory material is introduced in a free space between the two segments in order to develop the compensatory element. Here, the compensatory material can be injected, sprayed on and/or spread. Moreover, the compensatory material can be a chemically hardening and/or a physically setting adhesive. A chemically hardening adhesive can be, for example, a two-component adhesive. A physically setting adhesive can harden, for example, with ultraviolet rays.

It is also advantageous if the compensatory material is solidified for developing the flexible and/or elastic compensatory element. The compensatory element allows the translational and/or rotational misalignment to be compensated.

BRIEF DESCRIPTION OF THE DRAWINGS

Additional advantages of the disclosure are described in the following drawings.

DETAILED DESCRIPTION

FIG. 1 shows a disposable mold core 1 to produce a component 15 (cf. FIG. 4) that has a rotational misalignment 4. In this embodiment, the mold core 1 is bent or crooked. Here, the rotational misalignment 4 indicates the misalignment between the mold core 1 according to the form with the dotted line, which indicates that the mold core 1 should have this form, and the form of the actual mold core 1 (cross-hatched mold core 1). To illustrate this better, the bend or rotational misalignment 4 is shown here in a highly exaggerated way. It is disadvantageous here that such a bent, crooked mold core 1 having the rotational misalignment 4 will produce a defective component 15.

Figure 1A:
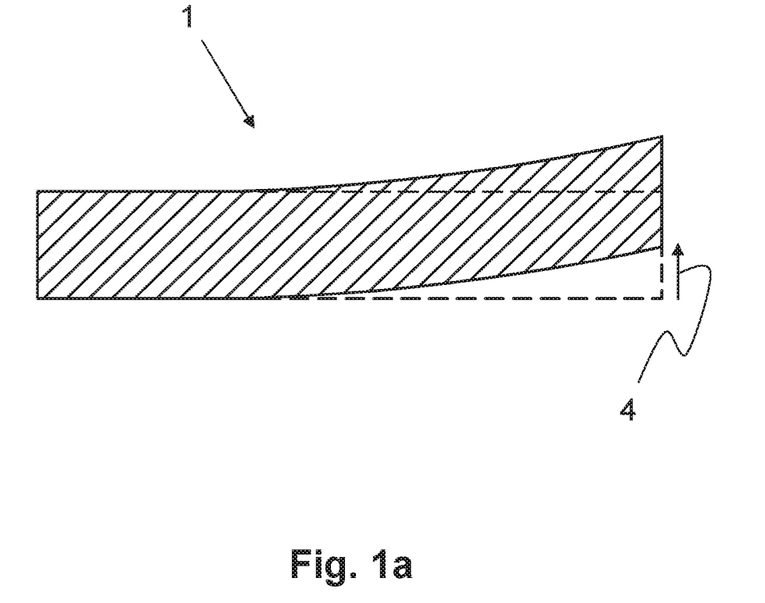
FIG. 1a is a lateral sectional view of a disposable mold core with a rotational misalignment.
Figure 1B:
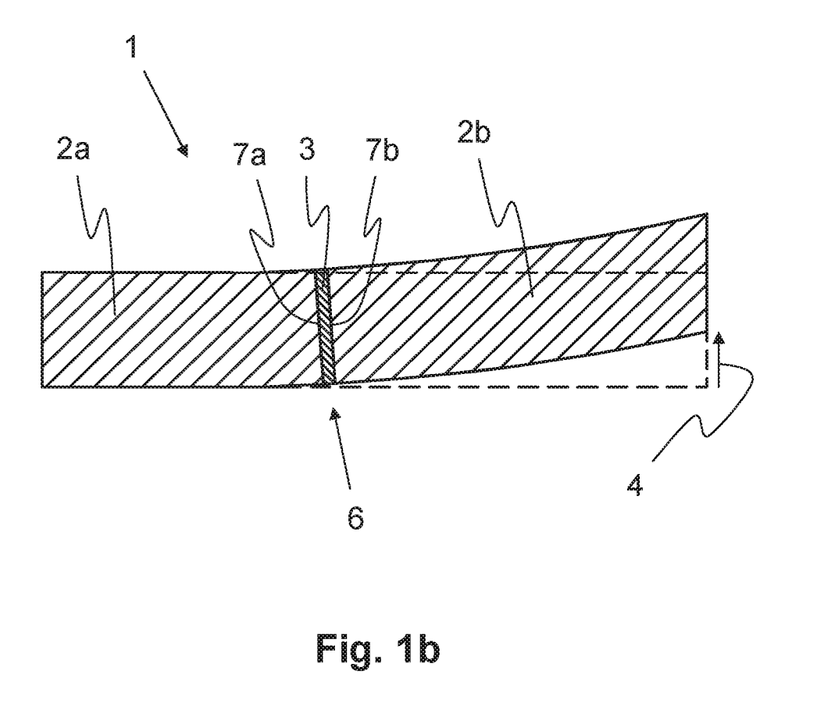
FIG. 1b is a lateral sectional view of a disposable mold core with a rotational misalignment, two segments and a compensatory element.

In one aspect of the disclosure, the disposable mold core 1 of FIG. 1b includes at least one elastic and/or flexible compensatory element 3 between two segments 2a, 2b of the mold core 1. Naturally, the mold core 1 can also have more segments 2. The compensatory element 3 allows the two segments 2a, 2b to be joined to one another in such a relatively movable way that a translational and/or, as shown here, rotational misalignment 4 can be compensated.

In this case, the compensatory element 3 has been arranged in a connecting area 7a, 7b of the respective segment 2a, 2b. In this embodiment, the connecting areas 7a, 7b are arranged on the front side, on the respective segments 2a, 2b. Thus, the connection between the two segments 2a, 2b is created by means of the compensatory element 3.

Here, the mold core 1 can be split, for example, into the two segments 2a, 2b. However, the two segments 2a, 2b can also be manufactured separately.

In this case, the compensatory element 3 can include an elastomer, for example. As a result of that, the compensatory element 3 is elastic and/or flexible, so that the two segments 2a, 2b are relatively movable towards one another.

However, the compensatory element 3 can be, additionally or alternatively, an unhardened thermoplastic such as a polyvinyl alcohol. Here, the thermoplastic is first heated, introduced in a free space 6 between the segments 2a, 2b by spreading, injecting and/or spraying it (the compensatory element 3 has already been arranged here in the free space 6) and cooled once again, to re-solidify the thermoplastic. This has the advantage that the segments 2a, 2b can be aligned first before the heated thermoplastic is introduced in the free space 6. Also, while the thermoplastic is still hot, the segments 2a, 2b can still be aligned with respect to one another in order to compensate for a translational and/or rotational misalignment 4. The thermoplastic solidifies after cooling, thereby fixing the segments 2a, 2b together in place. In addition, the thermoplastic can be liquefied once again by re-heating it, so the segments 2a, 2b can be aligned one more time and/or the thermoplastic can be rinsed off the component 15 after it is manufactured.

The compensatory element 3 can also be an unhardened thermoset, which is introduced in the free space 6 like the thermoplastic. In addition, the segments 2a, 2b can be aligned as with the thermoplastic and fixed in place with the thermoset.

Additionally or alternatively, the compensatory element 3 can also be an adhesive that is still elastic and/or flexible in solidified state. Thus, the two segments 2a, 2b can be very easily joined. The adhesive can be spread, sprayed and/or applied on the connecting areas 7a, 7b. Afterwards, the two segments 2a, 2b can be joined together and the adhesive hardens on its own.

The compensatory element 3 can additionally or alternately also include an expansion material that expands when the temperature is increased. The expansion that takes place while the component 15 is being manufactured presses the two segments 2a, 2b apart in their axial direction. Here, the expansion presses the mold core 1 against an inner side of a molding tool 10 (cf. FIG. 1d), thereby pressing the reinforcement fibers 11 arranged between the mold core and the molding tool 10 against the inner side of the molding tool 10. As a result of this, the component 15 takes an inner form of the molding tool 10. Because of this, however, the play existing between the mold core 1 and the molding tool 10 can also be reduced.

Figure 1C:
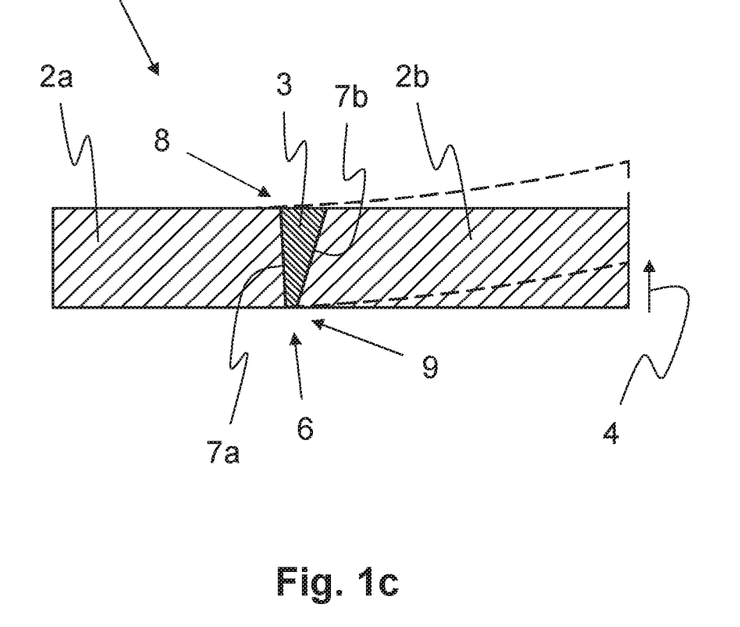
FIG. 1c is a lateral sectional view of a disposable mold core with compensated misalignment.

FIG. 1c shows the disposable mold core 1 from FIG. 1b, but the rotational misalignment 4 of the mold core 1 from FIG. 1b has been compensated. To do this, the elastic and/or flexible compensatory element 3 has been arranged between the two segments 2a, 2b. In addition, the two segments 2a, 2b have been moved relative to one another (compared to FIG. 1b or the dotted contour shown here), so that the rotational misalignment 4 is compensated. In this case, the compensatory element 3 has been stretched in a stretching area 8. The compensatory element 3 can also have, for example, a compression area 9 in which the compensatory element 3 is pressed together. Here, the compensatory element 3 keeps joining the two segments 2a, 2b.

Figure 1D:
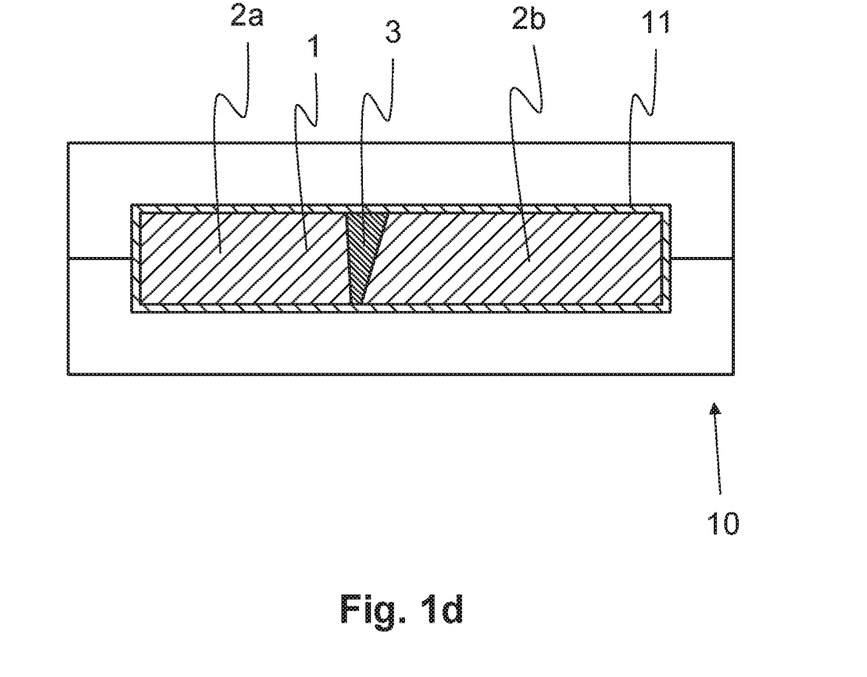
FIG. 1d is a lateral sectional view of a disposable mold core in a molding tool.

FIG. 1d shows the disposable mold core 1 in a molding tool 10. Here, the segments 2a, 2b have been joined together in a relatively movable way with the compensatory element 3. In addition, the rotational misalignment 4 (cf. FIG. 1a-1b) has been compensated to compensate for measurement inaccuracies or error tolerances. Reinforcement fibers 11 are arranged between the mold core 1 and the molding tool 10. The reinforcement fibers 11 can be impregnated with a matrix that hardens when the temperature and/or pressure are increased to create the component 15. However, the matrix can also be introduced until the temperature and/or pressure increase. After a cooling phase of the component 15, the matrix has solidified and formed a composite with the reinforcement fibers 11. Thereupon, the component 15 can be taken out of the molding tool 10.

In order to economize on the weight of the fiber-reinforced component 15, the mold core 1 can be rinsed off the component 15. To do this, a solvent is introduced in the component 15 through an opening (not shown), which dissolves the segments 2a, 2b and the compensatory element 3 so they can be rinsed off afterwards.

Figure 2:
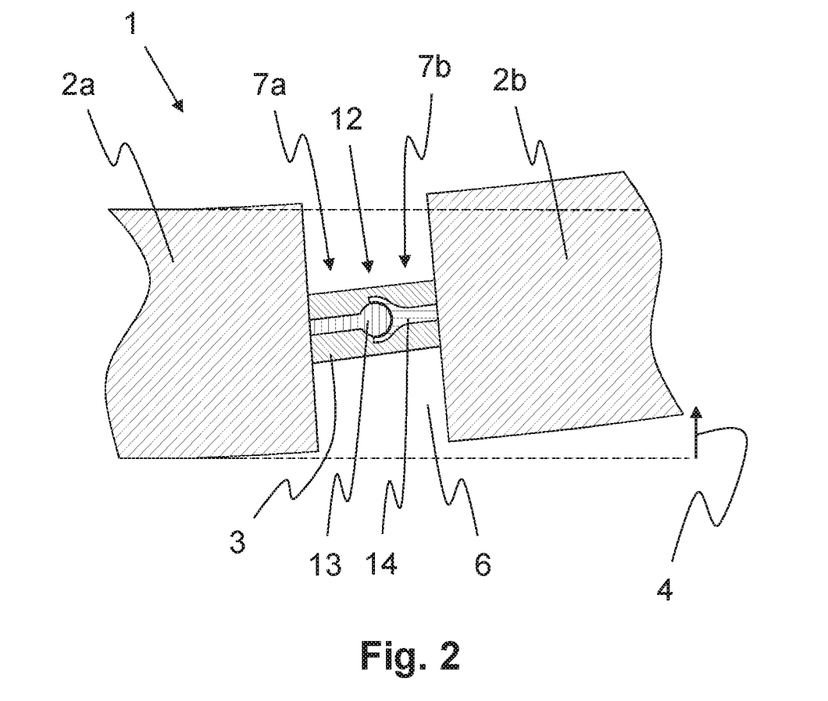
FIG. 2 is a lateral sectional view of a section of a disposable mold core and with an articulated joint.

FIG. 2 shows a lateral sectional view of a section of a disposable mold core 1 according to an alternative embodiment. Once again, the elastic and/or flexible compensatory element 3—which firmly joins the two segments 2a, 2b—is arranged between the segments 2a, 2b. Here, the compensatory element 3 has once again been arranged in the free space 6 between the segments 2a, 2b. As seen in FIGS. 1a and 1b, the mold core 1 has a rotational misalignment 4. The dotted lines indicate the mold core 1 without misalignment (as in FIGS. 1a-1b).

In this alternative embodiment, an articular joint 12 that firmly connects the two segments 2a, 2b is arranged between the two segments 2a, 2b. The articular joint 12 has been designed as two parts, wherein a spherical head 13 is arranged on segment 2a, and a ball socket 14 on segment 2b. In this case, the spherical head 13 is mounted on the ball socket 14, so that both can be twisted against one another. This makes it possible to compensate for the rotational misalignment 4 existing between the two segments 2a, 2b. Here, the spherical head 13 is the connecting area 7a of segment 2a and the ball socket 14 the connecting area 7b of segment 2b.

Since the articular joint 12 is surrounded by the compensatory element 3, the articular joint 12 becomes elastic. As a result of this, the articular joint 12 is also provided with a certain stability. The free space 6 can also be completely filled with the compensatory element 3.

Figure 3A:
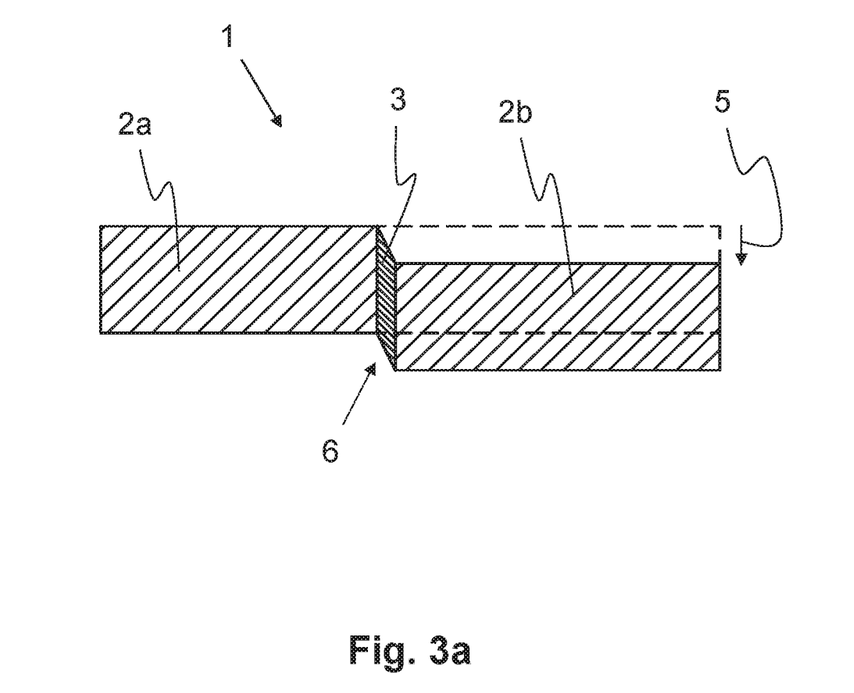
FIG. 3a is a lateral sectional view of a disposable mold core with a translational misalignment.

FIG. 3a shows a lateral sectional view of a disposable mold core 1 with a translational misalignment 5. Thus, the two segments 2a, 2b are misaligned parallel to one another. Once again, the compensatory element 3, with which the translational misalignment 5 can be compensated and which connects the two segments 2a, 2b, is arranged between the two segments 2a, 2b. In this case, the compensatory element 3 is once more arranged in the free space 6 (shown here filled once again).

Figure 3B:
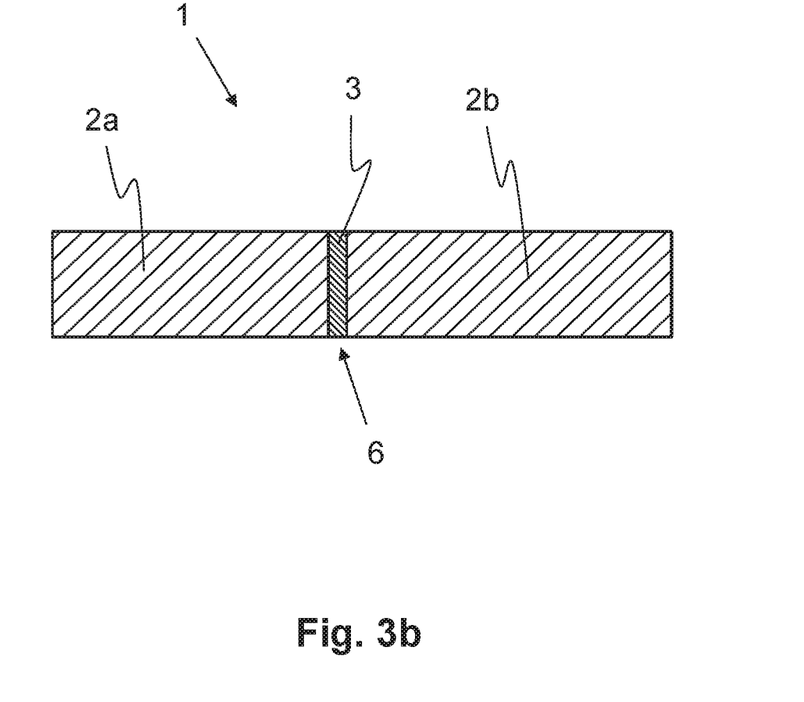
FIG. 3b is a lateral sectional view of a disposable mold core with a compensated translational misalignment.

FIG. 3b shows the disposable mold core 1 from FIG. 3a with a compensated translational misalignment 5. Once more, the two segments 2a, 2b are arranged axially with respect to one another. Here, the compensatory element 3 has essentially a shear stress caused by segment 2b being pushed upward against the translational misalignment 5 of FIG. 3a. The compensatory element continues to connect the two segments 2a, 2b.

Figure 4:
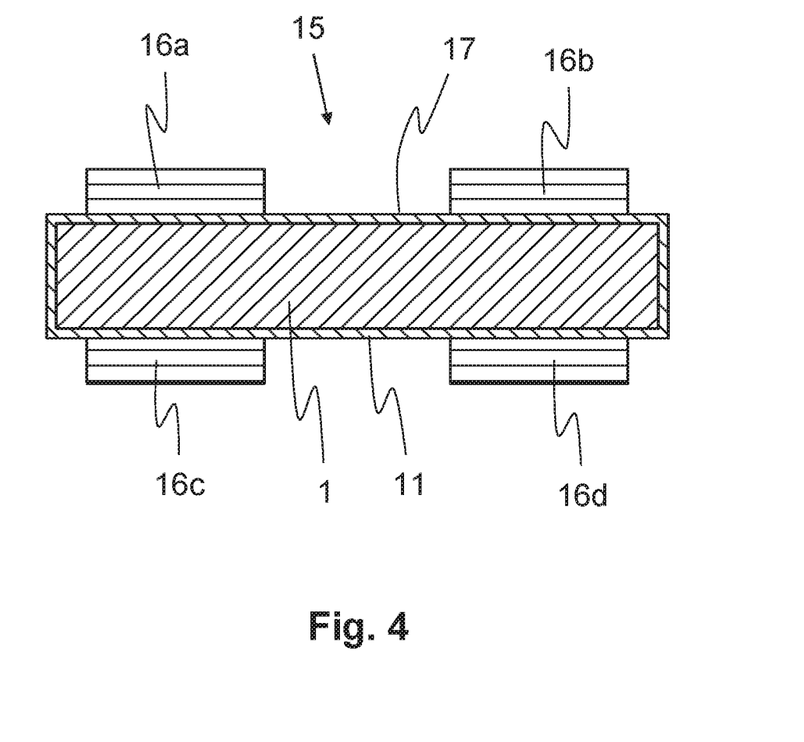
FIG. 4 is a lateral sectional view of a component with reinforcement elements.

FIG. 4 shows an additional aspect of the disclosure. Reinforcement elements 16a-d have been arranged on an outer surface 17 of a component 15. It is problematic to press the reinforcement elements 16a-d onto a hollow component 15 because the component itself 15 can be compressed and therefore damaged. In an additional aspect of the disclosure, the mold core 1 is still arranged in the component 15 while the reinforcement elements 16a-d are being pressed on, so that it cannot be compressed. Only after the reinforcement elements 16a-d have been pressed on will the mold core 1 be rinsed off. In this case, the mold core 1 can have all characteristics of the previous description. In particular, the mold core 1 can also have a described compensatory element 3.

The reinforcement elements 16a-d can be strengthening ribs and/or a molding material.

Figure 5:
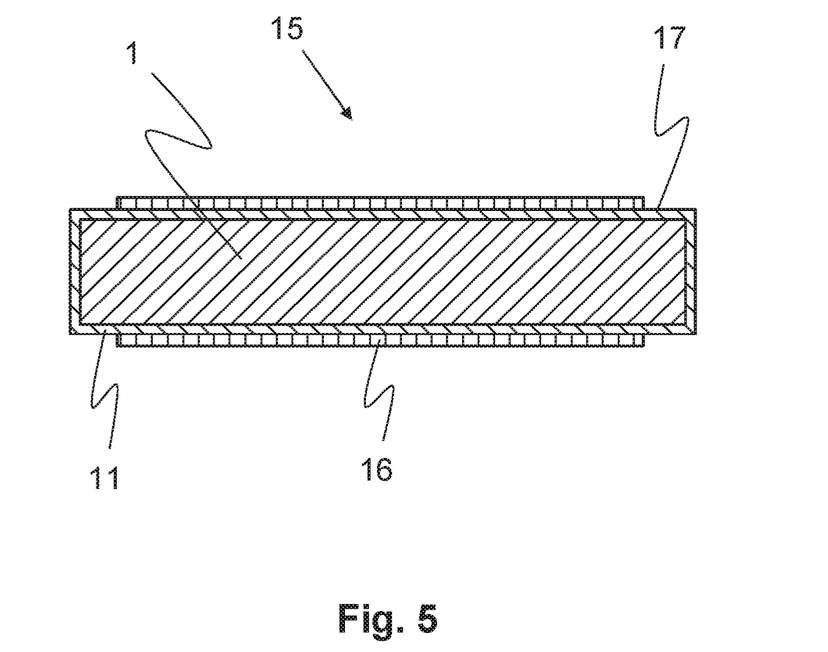
FIG. 5 is a lateral sectional view of a component with molding material.

FIG. 5 shows an embodiment, in which the reinforcement element 16 has been pressed onto the outer surface 17 of the component 15. In this embodiment, the reinforcement element 16 is executed as molding material, pressed at least onto areas of the outer surface 17 of the component 15. The molding material can include, for example, a mixture of reinforcement fibers with a matrix. This mixture can be C-SMC, for example. The molding material imparts stability to the component 15 without increasing its dimensions too much. The molding material can be thinly applied here.

Figure 6:
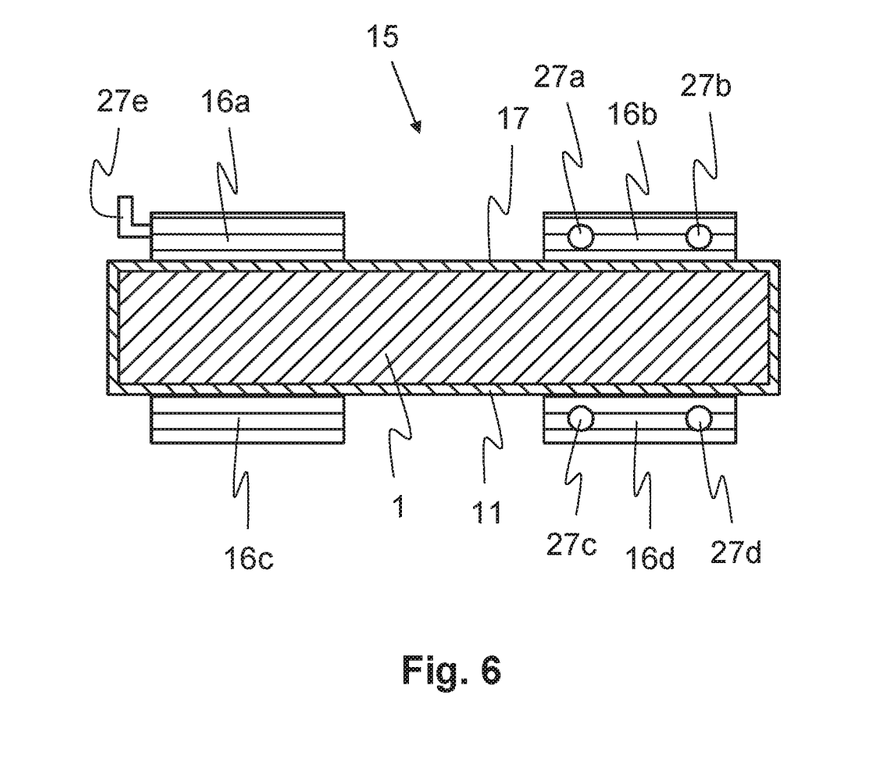
FIG. 6 is a lateral sectional view of a component with reinforcement elements and fastening elements.

FIG. 6 shows another embodiment of a component 15 with reinforcement elements 16a-d, here executed as strengthening ribs. The reinforcement elements 16a, b, d have fastening elements 27a-e here with which an additional element can be arranged on the component 15 and/or the component 15 itself can be arranged on another element. The fastening elements 27a-d can include sleeves, bores and/or threads or threaded inserts. The fastening element 27e is executed as hook.

Figure 7:
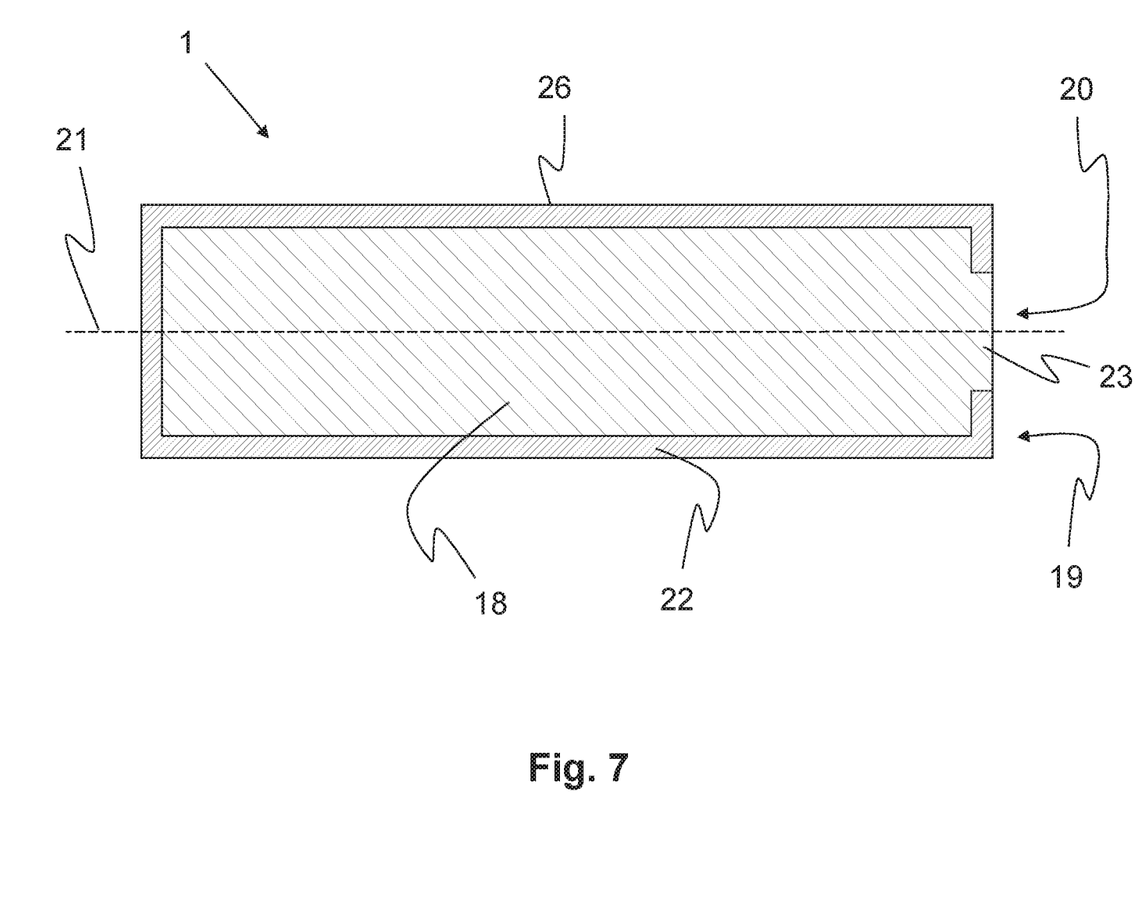
FIG. 7 is a lateral sectional view of a mold core with a shell.

FIG. 7 shows a lateral sectional view of a disposable mold core 1 with a hard shell 22 arranged in a cover area 19. The mold core 1 is developed from a granulate 18 solidified at least partially with a binder. In this embodiment, the binder is only arranged in the cover area 19 that extends from a surface 26 of the mold core 1 towards the core 20 of the mold core 1, so that it forms the shell 22 with the granulate 18. Since the granulate 18 has no binder in the core 20, it is not solidified. Here, the core 20 extends along the middle of a cross section 21 of the mold core 1. The granulate 18 in the core 20 can support the shell 22, so that the surface 26 of the mold core 1 can be impinged on with a pressure without damaging the shell 22. In this case, the granulate 18 can be arranged loose and/or compressed in the core 20. Since the core 20 is not solidified, the granulate 18 can be very easily removed from it or the mold core 1 after the component is manufactured.

The shell 22 can have here 3% to 10% of the thickness of the mold core 1 at the respective place. The shell 22 can also be less than 5 mm thick. The thickness of the shell 22 can also be less than 2 mm.

Furthermore, the shell 22 has an opening 23 through which the granulate 18 can be removed from the component 15, especially after the component 15 is manufactured. In particular, due to its own weight, the unsolidified granulate 18 can be very easily trickled out of the opening 23. Once the granulate 18 has been removed, the shell 22 can be rinsed off and/or smashed and removed as well, for example.

Figure 8:
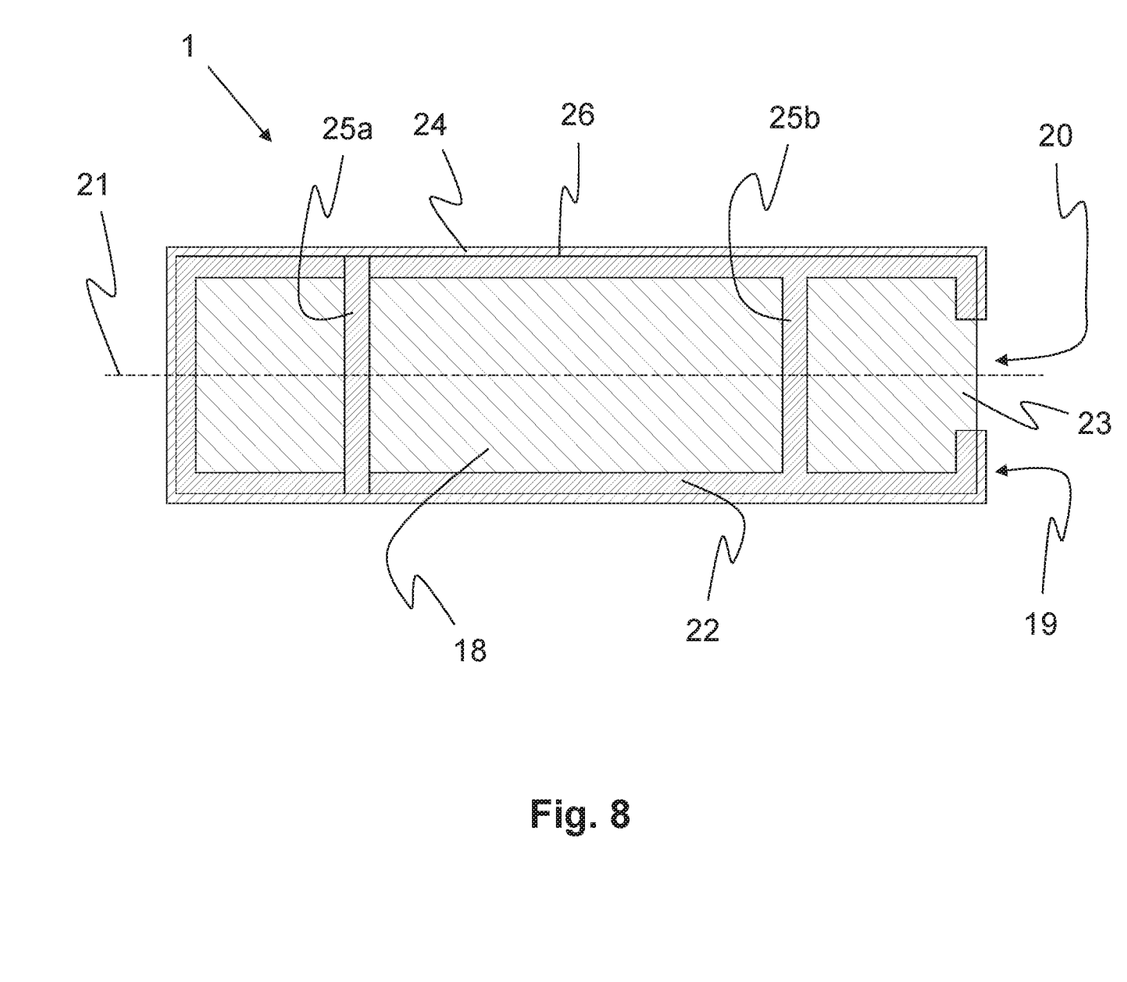
FIG. 8 is a lateral sectional view of the mold core with a separating layer.

FIG. 8 shows essentially the same mold core 1 shown in FIG. 7, so only the differences will be described here. In this embodiment, the mold core 1 includes a separating layer 24. This separating layer 24 prevents the matrix from diffusing into the mold core 1 or shell 22 while the component is being manufactured. A drawback of this diffusing is that the shell 22 and/or the granulate 18 can no longer be removed from the component or only with great difficulty. The separating layer 24 can prevent this.

The separating layer 24 has been applied here on the surface 26 of the shell 22.

Furthermore, the mold core 1 has two reinforcement braces 25*a*, 25*b* in this embodiment of FIG. 8. They extend through the mold core 1 from one side of the mold core 1 to the opposite side of the mold core 1. Here, the reinforcement brace 25*a* extends through the shell 22, thereby reaching from one section of the surface 26 of the mold core 1 to an opposite section of the surface 26. Thus, the shell 22 is adjacent to the reinforcement brace 25*a* and can be joined to it. On the other hand, the reinforcement brace 25*b* is arranged on the shell 22 and extends through the granulate 18 between the shell 22.

The present invention is not limited to the embodiments that were shown and described. Variations within the scope of the patent claims are just as possible as a combination of the characteristics, even if they are shown and described in different embodiments.

LIST OF REFERENCE CHARACTERS

1 Disposable mold core
2 Segment
3 Compensatory element
4 Rotational misalignment
5 Translational misalignment
6 Free space
7 Connecting area
8 Stretching area
9 Compression area
10 Molding tool
11 Reinforcement fibers
12 Articular joint
13 Spherical head
14 Ball socket
15 Component
16 Reinforcement element
17 Outer surface
18 Granulate
19 Cover area
20 Core
21 Middle of the cross section
22 Shell
23 Opening
24 Separating layer
25 Reinforcement brace
26 Surface
27 Fastening element

We claim:

1. A disposable mold core for producing a fiber-reinforced component, the disposable mold core comprising:
   a support core including a granulate and a binder, the support core having a hard shell formed of the binder and the granulate, and an inner core within the hard shell, the inner core being binder-free and formed of the granulate, the support core being configured as a printed, rapid prototyped element; and
   a separating layer which seals off the support core and is located on an exterior of the support core.

2. The disposable mold core of claim 1, wherein the granulate includes a base material including at least one of a mineral, a glass, a ceramic, and/or a sand.

3. The disposable mold core of claim 1, wherein the granulate of the inner core is arranged so that individual granulate grains within the inner core lie next to one another.

4. The disposable mold core of claim 1, wherein a concentration of the binder within the support core decreases in a direction from an outer surface of the support core towards an interior of the support core.

5. The disposable mold core of claim 4, wherein the concentration decreases from 100% to 0%.

6. The disposable mold core of claim 1, wherein the hard shell has a thickness of less than 5 mm.

7. The disposable mold core of claim 1, wherein at least one of the binder and the separating layer is dissolvable with a solvent.

8. The disposable mold core of claim 1, wherein the hard shell defines at least one opening sized for allowing removal of the inner core therethrough.

9. The disposable mold core of claim 1, wherein the support core includes at least two segments that can be rinsed off with a solvent, and further including a compensatory element arranged between and connecting the two segments to one another in a relatively movable configuration to compensate for misalignment between the two segments.

10. The disposable mold core of claim 9, wherein the compensatory element includes a material that expands when the temperature is increased, so that the two segments can be pressed apart upon heating.

11. The disposable mold core of claim 9, wherein at least one of the binder within the two segments and at least part of the compensatory element can be dissolved with a solvent.

12. A method of producing a fiber-reinforced component comprising the steps of:
   forming a disposable mold core via rapid prototyping using printing, the disposable mold core including a support core including a granulate and a binder, the support core having a hard shell formed of the binder and the granulate, and an inner core within the hard shell, the inner core being binder-free and formed of the granulate, the disposable mold core further including a separating layer which seals off the support core and is located on an exterior of the support core;
   arranging reinforcement fibers with a matrix on the disposable mold core;
   at least partially hardening the matrix in a molding tool by increasing at least one of the temperature and the pressure; and at least partially removing the disposable mold core.

13. The method of claim 12, wherein the at least partially removing step includes removing the inner core from the hard shell.

14. The method of claim 13, wherein the at least partially removing step includes rinsing the hard shell with a solvent after the inner core is removed.

15. The method of claim 12, wherein after the at least partially hardening step, while the disposable mold core is still inside the fiber-reinforced component, further including pressing at least one reinforcement element onto an outer surface of the fiber-reinforced component.

16. The method of claim 15, further including arranging the reinforcement element around the disposable mold core with the reinforcement fibers and the matrix before the at least partially hardening step.

17. The method of claim 12, wherein the disposable mold core includes at least two segments, the method further including the step of arranging at least one compensatory element between the at least two segments in such a relatively movable way to compensate for any relative misalignment between the two segments.

18. A disposable mold core for producing a fiber-reinforced component, the disposable mold core comprising:
  a support core including a granulate and a binder, the support core having a hard shell formed of the binder and the granulate, and an inner core within the hard shell, the inner core being binder-free and formed of the granulate;
  wherein the support core includes at least two segments that can be rinsed off with a solvent, and further including a compensatory element arranged between and connecting the two segments to one another in a relatively movable configuration to compensate for misalignment between the two segments.

19. The disposable mold core of claim 18, wherein the compensatory element includes a material that expands when the temperature is increased, so that the two segments can be pressed apart upon heating.

20. The disposable mold core of claim 18, wherein at least one of the binder within the two segments and at least part of the compensatory element can be dissolved with a solvent.

21. A method of producing a fiber-reinforced component comprising the steps of:
  providing a disposable mold core including at least two segments;
  arranging at least one compensatory element between the at least two segments in such a relatively movable way to compensate for any relative misalignment between the two segments;
  arranging reinforcement fibers with a matrix on the disposable mold core;
  at least partially hardening the matrix in a molding tool by increasing at least one of the temperature and the pressure; and
  at least partially removing the disposable mold core.

22. The method of claim 21, wherein the compensatory element includes a material that expands when the temperature is increased during the at least partially hardening step, so that the two segments are pressed apart.

23. The method of claim 21, wherein the mold core includes a support core including a granulate and a binder, the support core having a hard shell formed of the binder and the granulate, and an inner core within the hard shell, the inner core being binder-free and formed of the granulate; and
  wherein, during the partially removing step, at least one of the binder within the two segments and at least part of the compensatory element is dissolved with a solvent.

* * * * *